Patented Mar. 18, 1947

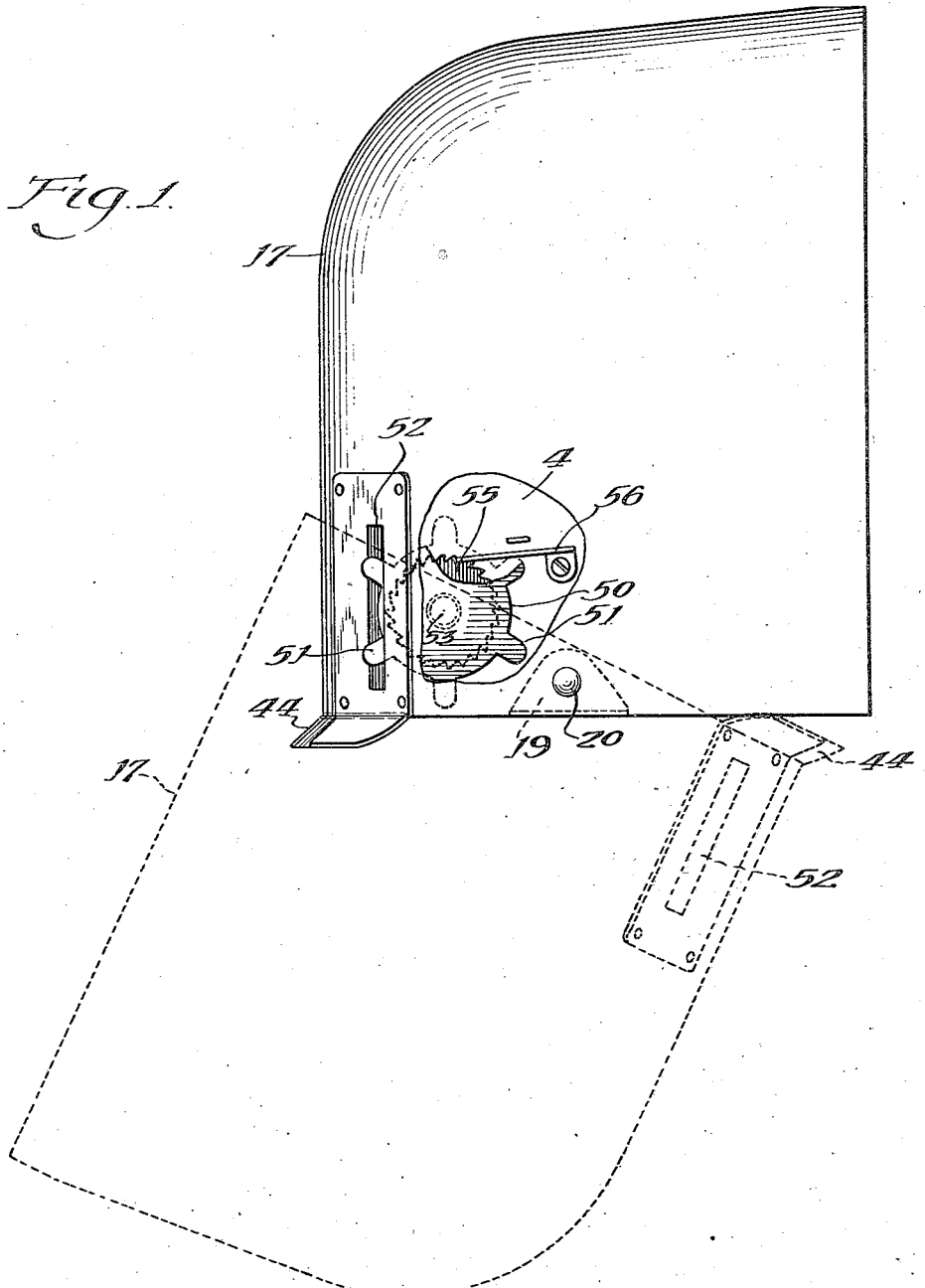

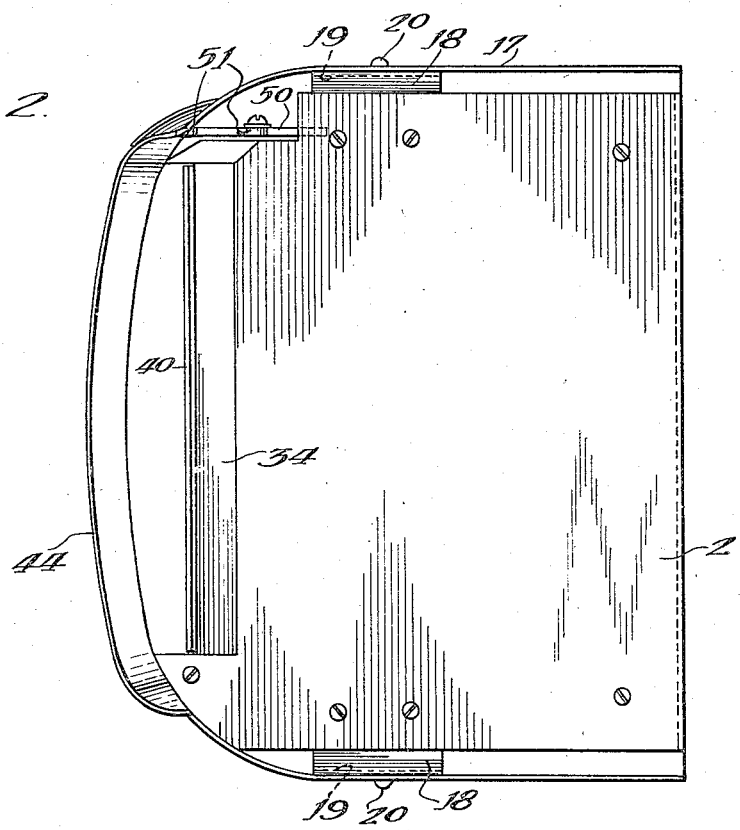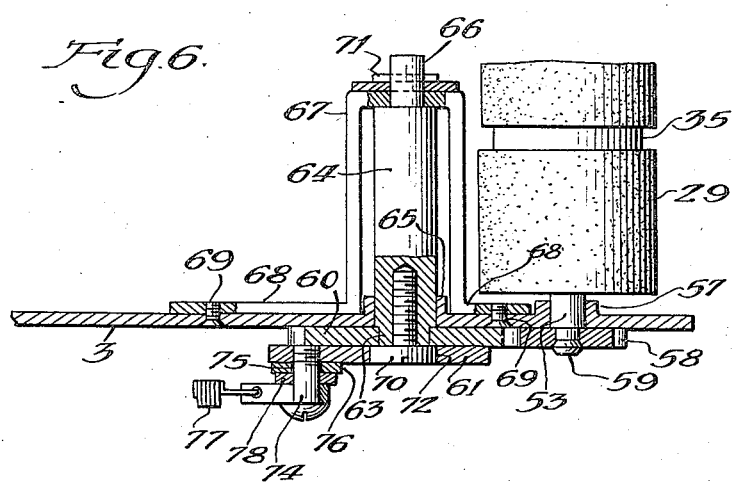

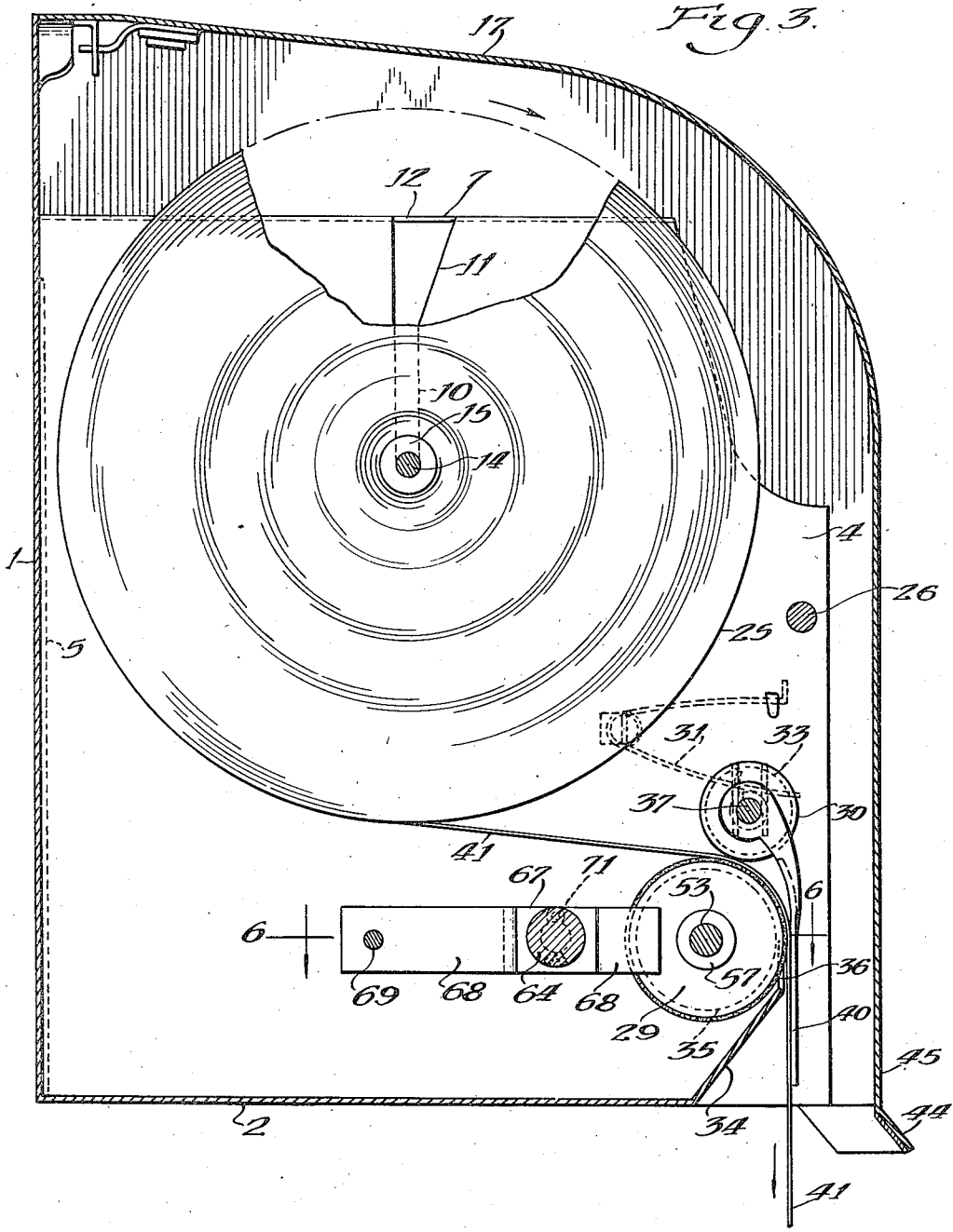

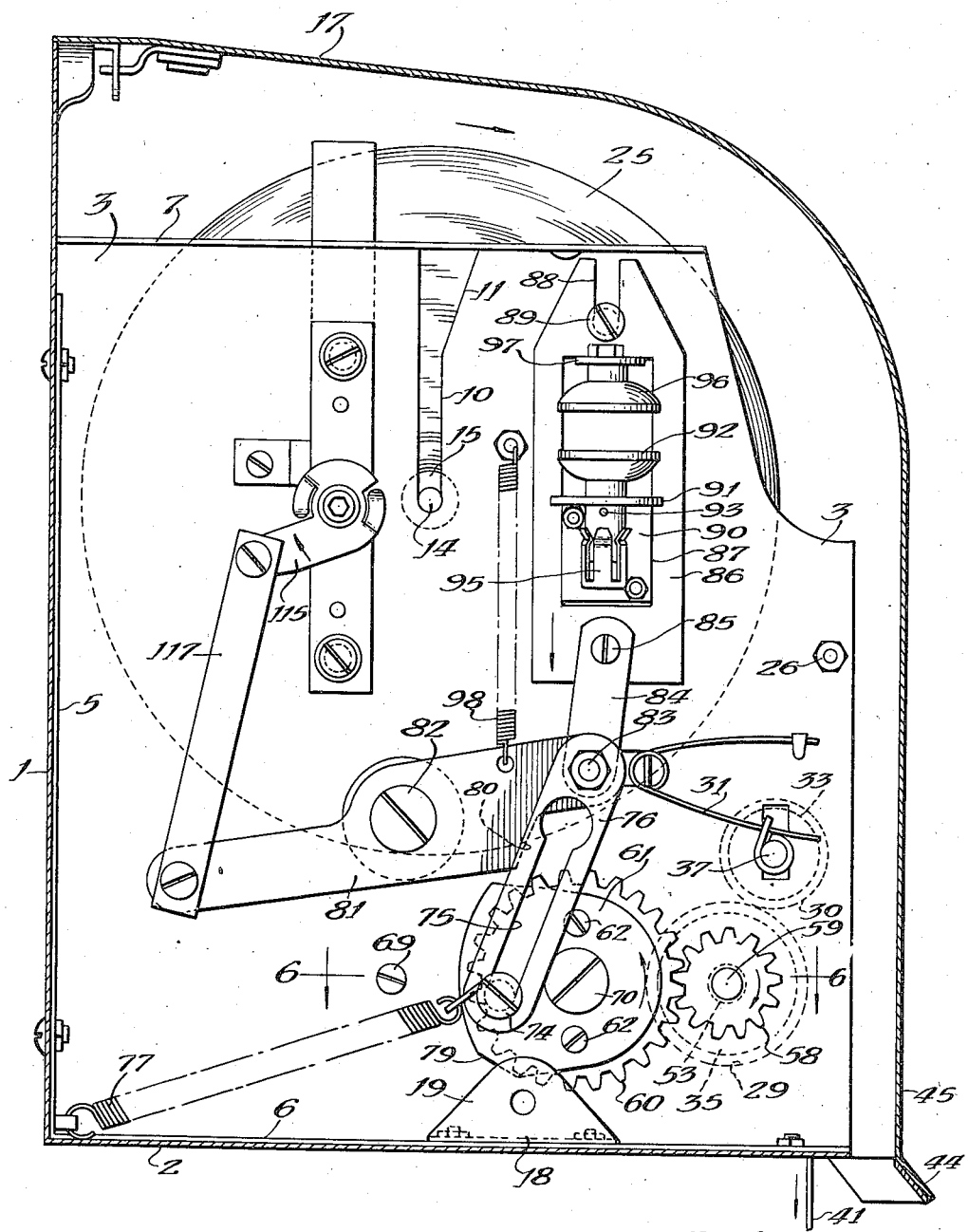

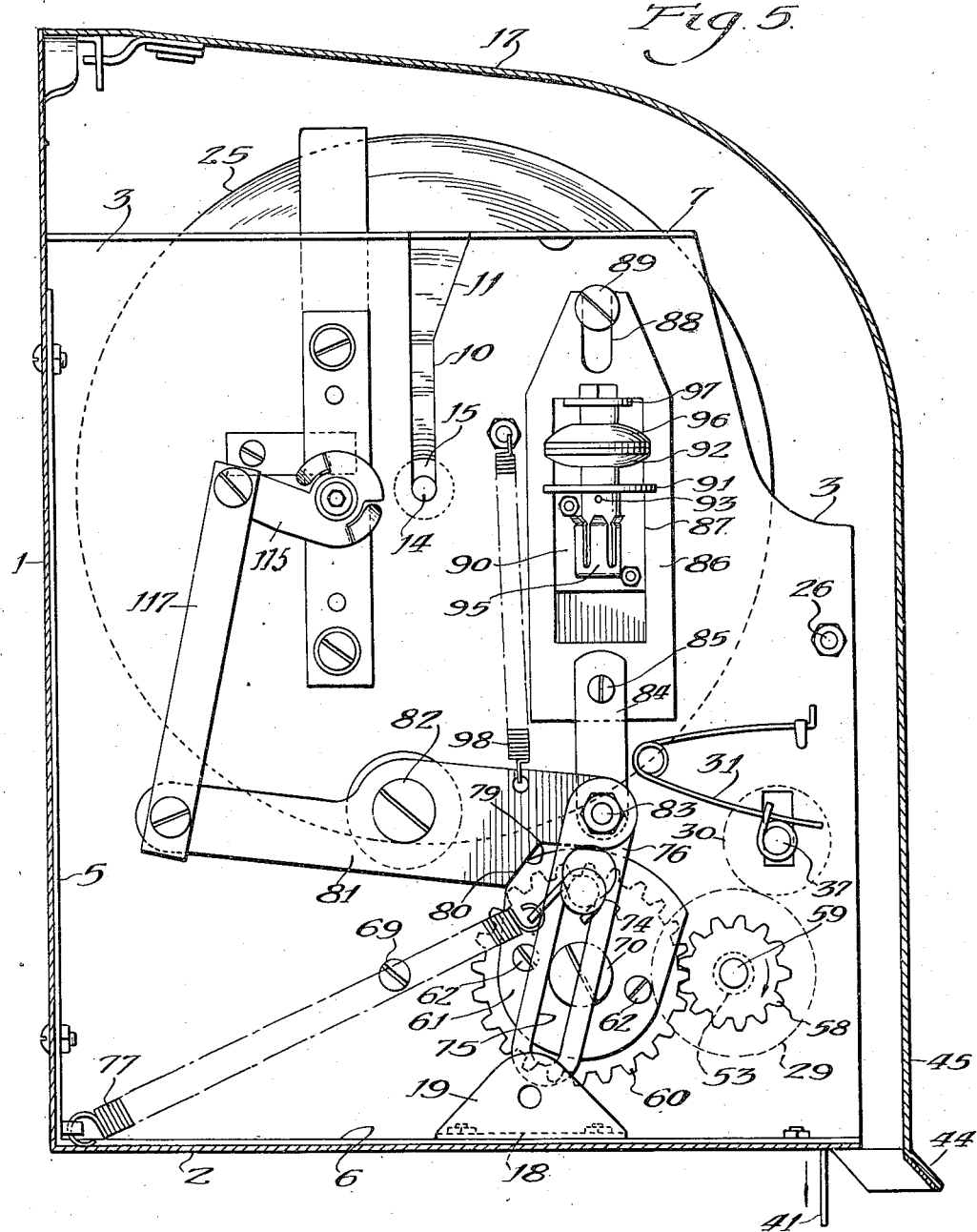

2,417,731

UNITED STATES PATENT OFFICE 2,417,731

DISPENSING APPARATUS

Rudolph G. Birr, Lombard, Ill., assignor to Steiner Sales Company, Salt Lake City, Utah, a corporation of Utah Original application July 14, 1944, Serial No. 544,919. Divided and this application June 20, 1945, Serial No. 600,624

16 Claims. (Cl. 271—2.3)

This invention relates to improvements in dispensing apparatus and is divisional of my copending application Serial No. 544,919, filed July 14, 1944, for Dispensing apparatus. Although the same title has been used for this application as for the parent copending application, the present application is directed particularly to improvements in the stop mechanism.

Heretofore it has been the practice to use a part of a reciprocal timer slide as a stop, and such a use is shown in Grunwald Patent No. 2,998,882. It has also been the prior practice to use a leverlike stop which in turn operated a sliding element of a timer. Such a scheme is shown in Birr Patent No. 2,193,759. Both of these schemes have objections. In the first mentioned scheme the slide and its guides are submitted to violent impacts when one stop engages the slide. On the other hand the timer shown in Birr requires the timer slide to be passed through a slot in a plate which supports the mechanism and requires the slide to extend in a direction which is parallel with the rotative axis of the measuring roll. This scheme is objectionable because of the tendency of the slide to tip and bind in the slot. This binding tendency was overcome in the Grunwald Patent but in that patent the slide was used as a stop, with the objection previously noted.

The present construction provides a timer mechanism in which the timer slide is not submitted to stop impacts, and in which the slide does not pass through a slot in one of two plates, on which all of the mechanism is supported.

Among the objects herein are: to provide an improved stop mechanism controlled by and controlling a measuring roll or equivalent means by which sheet material is dispensed; to provide a stop mechanism which can be connected to or disconnected from a timer, to permit of changeover or conversion from one type of control to another; to use a stop as an intermediate linkage element for connection of a stop mechanism with a timer so that as the stop moves to stop position the timer is set; to use a spring on each stop, one on a first stop to hold it against a second stop, and one on the second stop to move it away from the first stop; to have a spring act on a first gear to drive a second gear to move the measuring or feed roll in dispensing direction; to arrange the stopping surfaces of the stops in a more advantageous relation to one another and to the stop-separating springs; to obtain camming action of one stop to facilitate release of the other stop; to provide a mounting for the gear which has the stop such as will better withstand the shock of impact of the stops; and to provide a dial and ratchet mechanism by which the stop can be set against the action of a spring which is adapted to automatically move one of the gears to dispense sheet material on release of the stop. Features of the invention include all details of construction related to the stop mechanism, and to the mounting of its gears.

Objects, features and advantages of the invention will be set forth in the description of the drawings forming a part of this disclosure, and in said drawings—

Fig. 1 is a side elevation of the cabinet with parts broken away to show the feeding dial, and showing in dotted lines the position of the cover during servicing;

Fig. 2 is a bottom plan of the cabinet;

Fig. 3 is a vertical section taken between the supporting plates and showing part of the bearing structure for the stop-carrying gear and showing the relation of the feed rolls to the tear-off knife and paper-spacing apron;

Fig. 4 is a vertical transverse section through the cabinet looking at the outer face of one of the supporting plates and showing the time-stop mechanism with the parts in their normal or released position;

Fig. 5 is a view similar to Fig. 4, but showing the parts in stopping position as during the timing period; and Fig. 6 is a detail horizontal section taken on line 6—6 of Fig. 4 showing how the bearings for the gears and one end of the measuring roll are mounted for ease of assembly and strength.

The cabinet is composed of an inner section or body and an outer section or cover. The inner section is formed from a single sheet of metal bent to provide the vertical back 1 and the horizontal bottom 2. Secured to and stiffening the back and the bottom and in turn reenforced thereby are two mechanism-supporting plates 3 and 4 by which substantially all of the mechanism of the cabinet is carried. Each of these plates is provided with three stiffening flanges respectively designated 5, 6 and 7. The flanges 5 and 6 are connected by screws to the back and the bottom, and the plates with their flanges thus stiffen the structure.

In each supporting plate is a downwardly extending slot 10 made wider at the top as at 11. These slots intersect the top flanges 7 as best shown at 12 in Fig. 3. By enlarging the vertical slots 10 at their upper open ends the trunnions 14 of the supply roll-supporting bar 15 are easily introduced into the slots.

A one-piece cover 17 provides the top, front and sides of the cabinet, and this cover is pivoted at its lower edge about midway between front and back (see Figs. 1, 2 and 3) to brackets or plates 18 secured to the top faces of the bottom flanges 6 of the plates 3 and 4. These brackets extend outwardly beyond the flanges 6 and have vertical flanges 19 having openings which receive the pivots 20 of the cover.

A suitable key-operated lock is provided for the cover. Suitable slots (not shown) are provided in the back 1 by which to hang the cabinet on the wall. The cover can be moved downwardly to a position shown in dotted lines in Fig. 1 to act as a support for the supply roll 25 while the paper is being threaded between the feeding rolls, see Fig. 3.

The supporting plates 3 and 4 are cross-connected at the front by a stiffening bar 26. Below this bar are the feed rolls. One of these rolls is a measuring roll 29. A presser roll 30 lies above the measuring roll and is yieldably pressed thereagainst by springs 31. This presser roll 30 is reduced in diameter as in 33 to facilitate action of fingers placed in this reduced portion, the preliminary introduction of paper forwardly between the rolls while the supply roll 25 is being supported by the cover 17 when in the dotted-line position of Fig. 1. The measuring roll is grooved as at 35 to receive fingers 36 which are integral with an upturned portion 34 with the bottom 2 of the inner unit.

Depending from and swingable about the ends 37 of the shaft of the presser roll is an apron 40 which normally lies in a position of Fig. 3 to hold the paper 41 spaced rearwardly of a tearoff knife on the bottom of the cover to facilitate introduction of the fingers for grasping of the paper to pull it out and tear it off against the lower edge of the forwardly, downwardly slanted portion 44 of the bottom of the front wall 45 of the cover 17. Referring to Fig. 2, it will be noted that the knife edge is curved.

Another feature of the invention (see Figs. 1 and 2) is the use of an emergency dial 50 having fingers 51 which are adapted to project forwardly through a slot 52 of the cover 17 as shown in Fig. 1. I believe it is entirely new to use a dial in the type of cabinet in which paper is automatically fed out as soon as the stop is released by the timer. The purpose of the dial is to permit manual operation to preliminarily feed the paper to the position of Fig. 3, at which position it can be grasped by the user. Ordinarily, this dial or disk 50 is only used preliminarily to condition the cabinet for its first use. It may be considered as an emergency feeding means. The disk is attached to the shaft 53 of the measuring roll 29, or to a trunnion of that roll.

Another feature of the invention is the arrangement on this shaft 53 and between the dial 50 and the outer surface of the supporting plate 4, of a relatively fine-toothed ratchet wheel 55. This wheel is held against motion in one direction by a pawl 56 suitably pivoted to plate 4. This fine-toothed pawl-controlled wheel 55 facilitates dial-feeding action against the force of certain springs later described, and including a spring which causes automatic feeding after the time stop is released at the end of the time period. It will be understood that this dial feed-out action is opposed to spring power during setting of the time stop, and that the setting of the time stop is made against the action of at least one power spring, but in this particular embodiment, against two power springs.

Another feature of this invention best shown in Fig. 6 relates to the mounting of the driving gears by which the measuring roll controls and is controlled by a stop mechanism, or by a time-stop mechanism. This mounting is particularly required because of the violent strains to which the bearing of the stop-carrying gear is submitted, when the gear is suddenly arrested by engagement of the stops. Moreover, in the type of stop mechanism used, one of the gears has a spring which acts automatically on that gear to cause an automatic feed-out of the paper when the time stop is automatically released at the end of the timing period. These gears and their related elements are mounted on the supporting plate 3 of the inner unit.

The shaft 53 of the measuring roll passes outwardly through a struck-out bearing 57 of the plate 3 and the outer end of the shaft is reduced in diameter to receive a small spur gear 58 and to provide a shoulder against which this small gear is forced and secured as by peening over. This reduced portion 59 may be squared. A large gear 60 meshes with the small gear and carries the stop 61 secured by screws 62 to the gear 60. The gear 60 is attached to a reduced and squared portion 63 of a long shaft 64, which has one end rotative in a punched-out bearing 65 of the plate 3. The other end 66 is reduced and is rotative in a remotely placed bearing opening in a U-shaped strap-like bracket 67. Extensions 68 of the bracket are connected to the inner face of plate 3 as by screws 69. The gear 60 and its stop 61 are releasably held to the shaft 64 by means of a suitable screw 70, the head of which lies in an opening of the stop 61. The shaft 64 is held against axial translation by means of a split key 71, engaging a washer interposed between the end of the bracket 67 and the key. A rugged bearing is thus provided.

Assembly of the stop mechanism, including these gears, is also facilitated by the structure described. The shaft 64 can be simply inserted into its bearings, and the large gear 60 with its stop 61 then be placed on the reduced portion and in mesh with gear 58, and the screw 70 applied. As to the small gear, it can be placed on its squared portion and secured by peening either before or after the large gear is applied. Preferably, the stop 61 of the large gear is attached to the gear before the gear itself is secured to its shaft.

The stop 61 or the gear 60 carries a pin 74 which passes (see Figs. 4 and 5) through a slot 75 of a timer-setting link 76. A clip, to which one end of the automatic feed-out spring 77, is attached is releasably hooked over pin 74, a washer 78 being inserted between this clip and the link 76.

The slanting stopping surface 79 of stop 61 is engageable with a slanting stopping shoulder or surface 80 (see Fig. 5) to limit the motion of the dispensing roll 29. The surface 79 is adapted to have a camming action on surface 80. The stop shoulder 80 is formed on a swingable stop arm or lever 81 pivoted as at 82 to a punched-out projection of the plate 3, which projection spaces the inner surface of the lever from the face of the plate. The stop arm may have the form of a lever as shown, to provide part of a brake-operating means such as is disclosed in the parent copending application. It is a feature herein that stop 81 may be a lever of the first class, and that the brake mechanism may be applied later.

A detachable pivot 83 on stop arm 81, passes through one end of the slotted link 76 and through a second short link 84. The link 84 is pivoted as at 85 to a slide plate 86 of a timer mechanism. This plate 86 is cut out centrally as at 87 and has at its top an inwardly extending slot 88. A guide screw 89 passes through the slot 88 as shown. A bracket 90 engages the sides of the opening 87 and forms a second guide for the slide 86. The slide is held against movement away from the face of the plate 3 by means of vertical surfaces of a horizontal shelf 91 which is of greater width than the width of the opening 87. On the shelf is mounted a vacuum cup 92, the entry of air into which is controlled through an opening 93 controlled by a needle valve which can be adjusted by the finger piece 95. Cooperative with the cup 92 is a second cup 96 carried by horizontal bracket 97 of the slide 86. A spring 98 connects at one end with the stop 81 and the other end is secured to the plate 3 as shown. This spring 98 assists in moving the parts to the position shown in Fig. 4 following the release of the stops, as will be more fully explained. The use of the elements 81, 76 and 84, all connected by a common pivot 83, is a valuable feature in permitting the stop to be used without a timer, or in permitting the use of the stop and timer without the use of the brake, and thus permitting a change-over from one type of cabinet to another.

Although this application is not concerned with the operation of a brake for the supply roll, yet I have shown how the stop 81 can be connected to a link 117 which is in turn connected to a camming lever 115 for operating a suitable brake.

The connection of the three elements 76, 81 and 84 by a common pivot 83 in the manner shown has the advantage that the stop mechanism can be used with or without the timer, and yet a change-over can easily be made to add or take off a timer. Where the timer is not used, then the spring which acts to move the gear automatically when the time stop is released is, of course, not used. Nevertheless, even without the use of this spring the link connection of the gear or stop to the stop arm 81 is a valuable construction. If the slotted link and the lever 81 only are being used and it is desired to add the timer, this can easily be done by attaching the timer to the plate 3 and then operatively connecting it by short link 84 to the common pivot 85.

It will be noted by reference to Fig. 5 that the stopping surfaces 79 and 80 are so related to the direction of application of force by the spring 77 and to the pivotal axis of the gear 60 that the spring can cause the stopping surface 79 to perform a camming action against the stopping surface 80, to move the stop 81 away from the stop 61 when the timer ceases to hold the second stop, and it will be further noted that the second stop has a spring 98 which assists the camming action in the separation of the stops.

It will be further noted that where the spring 77 is used, its force is added to that applied by the user as he pulls out the paper, so that the bearings of the gear 60 are submitted to more than the usual strain due to impact of the stops. Thus, the bearings are under unusual strain. To this end the gear 60 is attached to the outer end of a relatively long shaft 64, and the outer portion of which shaft is rotatably supported in a bearing 65 of the plate 3 and the inner end of which shaft is remotely supported in a bearing formed by the strap 67.

*Operation*

The dispensing operation is as follows: first referring to Fig. 4 which shows the mechanism with the paper 41 ready to be grasped by the user and pulled out. When the user pulls on the paper the measuring roll and its gear 59 are moved in clockwise direction, the large gear 60 and its stop 61 are moved in counter-clockwise direction, the pin 74 acting on the link 76 pulls the stop shoulder 80 into the path of stop 61, and as this motion continues the stops assume the stopping position shown. During this act of dispensing the link 84 moves the slide 86 downwardly and the cup 96 becomes vacuum-attached to the cup 92 as shown in Fig. 5 and timing begins. If a brake is used, motion of the stop arm 81 to stopping position moves the link 117 to correspondingly move the lever 115. At the same time the spring 77 (see Fig. 4) is put under tension with the pin 74 in the position shown. On release of the stops 61 and 80 by the timer, spring 77 acts to move the gear 60 in anticlockwise direction to automatically eject a short length of the toweling to a position to be grasped by the same or to a subsequent user.

It is also against the action of this spring 77 that the force applied to the dial 50 must act. The pawl 56 holds the dial against the reverse action of this spring during a portion of dispensing action. In fact, the force applied to the dial at first acts against both springs 77 and 98, but only against spring 77 until the pin 74 arrives at a position substantially diametrically opposite to the position in which it is shown in Fig. 4. After the pin has reached an over-the-center diametric position, the spring 77 acts on it to automatically force the stop 61 against the stop 81, which stop 81 has by this time been lowered into the path of the stop 61. Therefore, for this portion of the feeding cycle, the dial is not needed.

What I claim is:

1. A device of the class described, having a feed roll having a first gear, a second gear meshing with the first gear and having a first stop, a second stop adapted to move into the path of the first stop, a spring acting on the second gear in a direction to hold the first stop against the second stop and in a manner to move the second gear to obtain automatic feeding action of the feed roll after the stops are released.

2. A device of the class described, having a feed roll having a first gear, a second gear meshing with the first gear and having a first stop, a second stop adapted to move into the path of the first stop, a timer for holding the second stop in engagement with the first stop, a spring acting on the second gear in a direction to hold the first stop against the second stop, the stopping surfaces of the stops being so related to the direction of spring action that the spring causes the stopping surface of the first stop to perform a camming action on the stopping surface of the second stop which tends to move the second stop away from the first stop, when the timer ceases to hold the second stop.

3. A device of the class described, having a feed roll having a first gear, a second gear meshing with the first gear and having a first stop, a second stop adapted to move into the path of the first stop, a timer for holding the second stop in engagement with the first stop, a spring acting on the second gear in a direction to hold the first stop against the second stop, the stopping surfaces of the stops being so related to the direction of spring action that the spring causes the stopping surface of the first stop to perform a camming action on the stopping surface of the second stop which tends to move the second stop away from the first stop when the timer ceases to hold the second stop, said second stop having a spring which assists the camming action in the separation of the stops.

4. A device of the class described, having a feed roll rotatable between and having bearing in a pair of upright plates, said feed roll having a first gear, a second gear meshing with the first gear and having a first stop, a second stop adapted to move into the path of the first stop, a spring acting on the second gear in a direction to hold the first stop against the second stop and in a manner to move the second gear when the stops are released, the said second gear being attached to the outer end of a relatively long shaft the outer portion of which is rotatably supported in one of the upright plates and the inner end of which is remotely supported in a strap which is detachably secured to the inner surface of the same plate.

5. A device of the class described, having a feed roll rotatable between and having bearing in a pair of upright plates, a stop mechanism for said feed roll having a first gear connected to the feed roll at a point outside of one of the upright plates, a second gear meshing with the first gear and having a first stop adapted to violently engage a second stop which is adapted to move into its path, the second gear being attached to the outer end of a relatively long shaft, the outer portion of said shaft being rotatably supported in one of the upright plates, and the inner end of said shaft being remotely rotatably supported in a metal strap which is rigidly secured to the inner surface of the said upright plate, whereby the bearing points of the shaft are widely separated to better withstand the strains of violent impact of the first stop with the second.

6. A device for dispensing sheet material comprising, a measuring roll, a time-stop mechanism controlled by and controlling the measuring roll and including a spur gear driven by a gear on the measuring roll, a timer adapted to be set and thereafter be automatically released at the end of a time period, and a spring connected to said driven spur gear and adapted to be put under tension as the measuring roll is moved in measuring direction and as the time-stop mechanism is set, the parts being so related that the spring is under tension when the stop is in stopping position and is adapted thereafter to act on the gear when the stop is released to move said gear in a direction which will operate the measuring roll to feed a short length of paper to a position accessible to the user.

7. A device of the class described comprising, a dispensing roll, a stop mechanism and means by which it controls and is controlled by the dispensing roll, including a spring which is conditioned during dispensing action to thereafter automatically move the roll in dispensing direction after the stop mechanism is released, a finger dial adapted for turning the roll to put said spring under tension, a ratchet wheel rotatable with said dial, and a pawl adapted to hold the ratchet wheel against reverse rotation as the dial is operated against the action of said spring.

8. A device of the class described comprising, a dispensing roll, a stop mechanism and means by which it controls and is controlled by the dispensing roll, including a spring which is conditioned during dispensing action to thereafter automatically move the roll in dispensing direction after the stop mechanism is released, a finger dial adapted for turning the roll to put said spring under tension, a ratchet wheel rotatable with said dial, and a pawl adapted to hold the ratchet wheel against reverse rotation as the dial is operated against the action of said spring, said spring being attached to a spur gear which meshes with a spur gear rotatable with said roll.

9. A device of the class described, having a measuring roll, a first spur gear operated by the measuring roll, a second spur gear driven by the first spur gear, a stop mechanism having a stop on said second gear, a second stop movable into the path of the first stop, a timer, means by which the second gear operated the second stop and the timer, including a link pivoted to a part of the timer, a link pivoted to the second gear, and a pivot connecting said links to said second stop, and a spring acting on the said second gear, the parts being so related that the spring is under tension when the stops are in stopping position and is adapted to act on the second gear when the stop is released to move said gear in a direction which will operate the measuring roll to feed a short length of paper to a position accessible to the user.

10. A device for dispensing sheet material comprising, a measuring roll, first and second meshing gears, the first attached to the roll and the second having a first stop, a second stop engageable by the first stop, means for automatically moving the second stop away from the first stop, a timer, means operable by the second gear for moving the second stop into the path of the first stop and simultaneously setting the timer, the timer being adapted thereafter to prevent separation of the stops until the end of the time period, said means including a pin movable with the second gear, and means acting on the pin to automatically move the second gear after the stops are released and in a direction which will operate the measuring roll to feed a length of material to a position accessible to the user.

11. A device for dispensing sheet material, comprising a measuring roll, a finger dial for operating the measuring roll, a time-stop mechanism controlled by and controlling the measuring roll and including a spur gear as an intermediate between the measuring roll and the time-stop mechanism adapted to be set and thereafter be automatically released at the end of a time period, and a spring connected to the gear and adapted to be put under tension as the measuring roll is moved by the dial in measuring direction and as the time-stop mechanism is set, the parts being so related that the spring is under tension when the stop is in stopping position and is adapted to act on the gear when the stop is released to move said gear in a direction which will operate the measuring roll to feed the paper to a position accessible to the user.

12. A device of the class described, comprising dispensing rolls, a mechanism for automatically operating said rolls to dispense sheet material, means by which the rolls operate said mechanism to set it for automatic action, including a spring which is conditioned during dispensing action to thereafter automatically move the rolls, a finger dial for turning the rolls and adapted to set the ejecting mechanism against the action of said spring, a ratchet wheel rotatable with said dial, and a pawl adapted to hold the wheel against reverse rotation as the dial is operated against the action of said spring to set said ejecting mechanism for automatic release.

13. A dispensing cabinet comprising, first and second upright plates, a measuring roll journaled in both plates, a shaft between the plates and parallel with and close to the measuring roll and having its outer end journaled in the first plate, a bracket having two arms, one of which is close to the measuring roll and both of which are close to and parallel with the shaft, the said arms being connected by a bearing element in which the opposite end of the shaft is journaled, each arm having terminal lateral extensions by which it is secured to the inner side of said first plate, the outer end of said shaft having a shoulder at the outer side of the first plate, a first gear nonrotatably held on the shaft, a stop plate secured to the gear and having an opening, a screw passing through the opening and securing the gear against axial motion away from the shaft, a second gear movable with the measuring roll and meshing with the first gear, and a spring secured to the stop plate for moving it forcibly toward a second stop.

14. A dispensing cabinet comprising, a pair of upright plates, a measuring roll journaled in the plates, a shaft parallel with and close to the measuring roll and having one end journaled in one of the plates, a bracket in which the opposite end of said shaft is journaled, said bracket having two long arms, one of which is close to the measuring roll and both of which are close to and parallel with the shaft, the said arms being connected by a bearing element in which the opposite end of the shaft is rotatable, each arm having terminal lateral extensions by which the bracket is secured to the inner side of said plate, the outer end of the shaft projecting to the outer side of the plate and having a shoulder, a first gear on the shaft engaging the shoulder, a stop plate secured to the gear and having an opening, a screw passing through the opening and engaged with the end of the shaft and securing the gear against axial motion away from the shaft, a gear movable with the measuring roll and meshing with the first gear, and a spring secured to the stop plate for moving it forcibly against a second stop.

15. A dispensing device having upright plates, a measuring roll journalled in said plates, a first stop and means by which it is operated by the measuring roll, a plate flatly slidable against one of said upright plates, guides for the slide plate, a second stop mounted independently of said slide plate and engageable with the first stop, a link and first and second pivots connecting it respectively to said slide and said second stop, means pivoted on the second pivot and operable by means on the first stop to move the second stop into the path of the first stop during rotation of the measuring roll, timer means on the slide and on one of the guides of the slide adapted to be engaged to prevent release of the stops until the end of a time period, and a spring acting on the second stop to move it and said slide from stopping position.

16. In combination, a measuring roll, a stop mechanism comprising first and second stops, a pivot member for the second stop, means by which the first stop moves the second stop into the rotative path of the first stop and then releases the second stop for independent movement out of the rotative path of the first stop, including a link connected to said pivot member, a timing mechanism, and a link connected with said pivot member and with said timing mechanism for operating said timing mechanism in relation to the stops.

RUDOLPH G. BIRR.

REFERENCES CITED

The following references are of record in the file of this patent:

UNITED STATES PATENTS

| Number | Name | Date |
| --- | --- | --- |
| 2,367,202 | Cooper | Jan. 16, 1945 |
| 2,298,179 | Steiner et al. | Oct. 6, 1942 |